(12) United States Patent
Prasad et al.

(10) Patent No.: US 11,203,267 B2
(45) Date of Patent: Dec. 21, 2021

(54) DUAL-VOLTAGE CHARGING STATION AND METHOD

(71) Applicant: GM GLOBAL TECHNOLOGY OPERATIONS LLC, Detroit, MI (US)

(72) Inventors: Rashmi Prasad, Troy, MI (US); Chandra S. Namuduri, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 255 days.

(21) Appl. No.: 16/579,124

(22) Filed: Sep. 23, 2019

(65) Prior Publication Data

US 2021/0086646 A1    Mar. 25, 2021

(51) Int. Cl.

| | |
|---|---|
| *B60L 53/62* | (2019.01) |
| *H02J 7/02* | (2016.01) |
| *H02J 7/00* | (2006.01) |
| *B60L 53/18* | (2019.01) |
| *B60L 53/16* | (2019.01) |
| *B60L 53/30* | (2019.01) |

(52) U.S. Cl.
CPC .............. *B60L 53/62* (2019.02); *B60L 53/16* (2019.02); *B60L 53/18* (2019.02); *B60L 53/30* (2019.02); *H02J 7/0021* (2013.01); *H02J 7/0045* (2013.01); *H02J 7/022* (2013.01); *B60L 2210/30* (2013.01); *B60Y 2200/91* (2013.01); *B60Y 2300/91* (2013.01)

(58) Field of Classification Search
CPC .......... B60L 53/62; B60L 53/16; B60L 53/18; B60L 53/30; B60L 2210/30; H02J 7/0021; H02J 7/0045; H02J 7/022
USPC ....................................................... 320/109
See application file for complete search history.

(56) References Cited

U.S. PATENT DOCUMENTS

| | | | |
|---|---|---|---|
| 10,355,611 B2 * | 7/2019 | Nagashima | ............... H02J 3/38 |
| 10,505,455 B1 * | 12/2019 | Biskup | ............... H02M 3/1582 |
| 2013/0020993 A1 * | 1/2013 | Taddeo | ............... H02J 7/00045 |
| | | | 320/109 |
| 2020/0304026 A1 * | 9/2020 | Mu | ........................... H02J 7/02 |

* cited by examiner

*Primary Examiner* — Suresh Memula
(74) *Attorney, Agent, or Firm* — Quinn IP Law

(57) ABSTRACT

A dual-voltage charging station system for an alternating current ("AC") power supply and a mobile platform having a charging port includes a charge coupler, an AC-to-DC conversion stage, a cable, and a controller. The charge coupler has AC pins and direct current ("DC") pins configured to engage with respective AC and DC receptacles of the charging port. The conversion stage is connected to the charge coupler and the AC power supply, converts the supply voltage to a DC charging voltage, and relays an appropriate AC or DC accessory voltage. The cable connects to the charge coupler such that the AC pins receive the accessory voltage and the DC pins receive the DC charging voltage. The controller simultaneously delivers the accessory voltage and the DC voltage to the mobile platform via the AC pins and the DC pins, respectively.

20 Claims, 4 Drawing Sheets

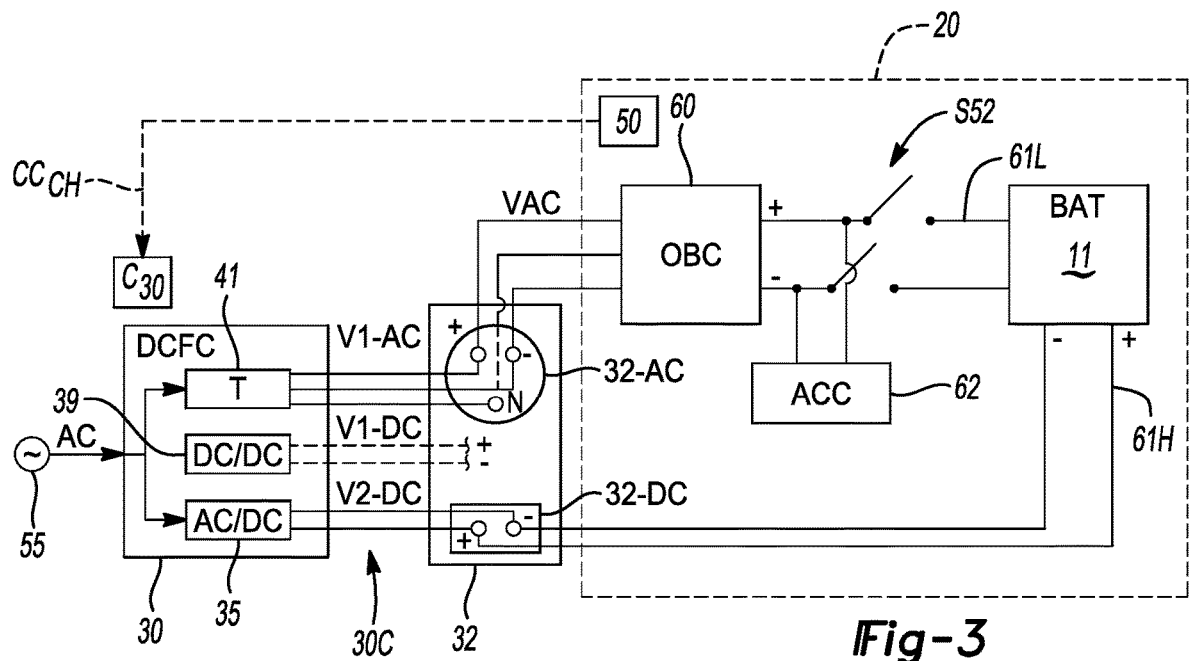
*Fig-3*
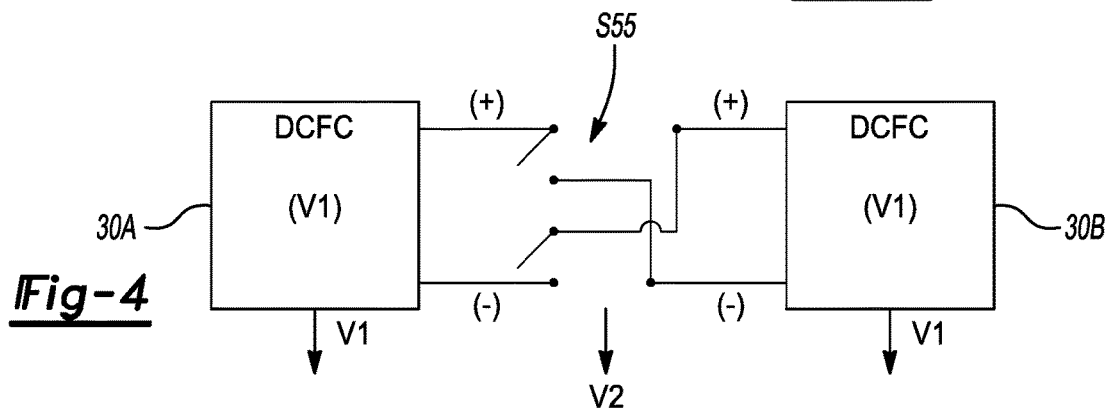
*Fig-4*
| OM | S62 | S62 | S62 | S62 | S62 | S62 |
|---|---|---|---|---|---|---|
| Ch: V2 - DC (30B)<br>Acc: V1 - DC (30A) | 0 | 1 | 0 | 1 | 1 | 1 |
| Ch: V1 - DC (30B)<br>Acc: V1 - AC (30A) | 1 | 1 | 1 | 1 | 0 | 0 |
*Fig-6*

DUAL-VOLTAGE CHARGING STATION AND METHOD

INTRODUCTION

The present disclosure relates to electric powertrains configured for energizing propulsion functions aboard electric vehicles and other rechargeable mobile platforms. Electric powertrains regularly include one or more polyphase/alternating current ("AC") rotary electric machines constructed from a wound stator and a magnetic rotor. The stator windings are connected to an AC-side of a power inverter module, with a direct current ("DC")-side of the power inverter module in turn connected to a DC voltage bus. When the electric machine functions as a traction motor, switching control of the ON/OFF states of individual semiconductor switches within the power inverter module is used to generate an AC output voltage at a level suitable for energizing the stator windings. The sequentially-energized stator windings produce a rotating magnetic field that ultimately interacts with a rotor field to produce useful machine rotation and motor output torque.

The above-noted DC voltage bus is electrically connected to an onboard voltage source typically embodied as a multi-cell high-voltage battery pack. Different offboard battery charging infrastructure and associated charge control methodologies provide a range of possible charging voltages. For instance, AC charging stations output a polyphase/AC charging voltage to the mobile platform. Aboard a mobile platform receiving an AC charging voltage, an AC/DC converter may be used to produce a DC voltage suitable for charging constituent cells of the battery pack. Alternatively, DC fast-charging ("DCFC") stations are capable of providing DC charging voltages well in excess of charging voltage levels available from AC charging stations. Therefore, DCFC stations may be used by some mobile platforms to expedite the charging process.

SUMMARY

A dual-voltage charging station is disclosed herein that simultaneously provides a mobile platform with a direct current ("DC") charging voltage at a relatively high-voltage level, and either an alternating current ("AC") or a DC accessory voltage at a relatively low voltage, with the term "dual-voltage" referring to the accessory voltage being lower than the DC charging voltage, as well as possibly being an AC voltage in some embodiments. The charging station utilizes one or more plugs/charge couplers to attach to a mating charging port of the mobile platform, with AC and DC pins of the charge coupler engaging mating AC and DC receptacles of the charging port.

In a possible application of the present teachings, with the mobile platform represented as an electric vehicle without limiting applications to such an embodiment, the accessory voltage is delivered at the first voltage level ("V1") from the charging station for use aboard the mobile platform when energizing an accessory load during charging, such as but not limited to an auxiliary power module, a traction power inverter, and/or an air conditioning compressor. Therefore, the first voltage level V1 is referred to herein interchangeably as the "accessory voltage" regardless of whether or how the accessory voltage is actually used aboard the mobile platform.

Simultaneously with delivery of the accessory voltage at the first voltage level V1, a DC battery pack of the mobile platform may be charged using the DC charging voltage, which is provided at a second voltage level ("V2") that is appropriate or suitable for its intended use, e.g., that equals the first voltage level V1 in some embodiments or exceeds the first voltage level V1 in other embodiments, e.g., by a factor of two or more. In a possible embodiment, for instance, the first voltage level V1 may be in the range of about 300-500V and the second voltage level V2 may be in the range of about 600-1000V, i.e., $V2=2*V1$, with other possible voltage levels being possible within the scope of the disclosure.

The disclosed circuit topologies provide certain performance advantages. As will be appreciated, an accessory load powered at the first voltage level V1 during charging would ordinarily require use of an onboard DC-DC voltage converter to reduce the DC charging voltage from the second voltage level V2 to the first voltage level V1. The expense, required packaging space, and substantial mass of installing such a DC-DC voltage converter aboard the mobile platform is eliminated using the present teachings, with each of the present circuit topologies characterized by the absence of an onboard DC-DC voltage converter. However, a DC-DC voltage converter may be housed within the offboard charging station in some of the embodiments noted herein.

The charging station may receive an AC supply voltage from an AC voltage source, for instance polyphase grid power provided from a power generation station. As is well understood in the art, electrical grid power is generated by a power generation station, transmitted across a network of power lines and substations, and ultimately delivered to a point of use. The voltage level of the supplied grid power is progressively lowered along a path of transmission, for example using a series of voltage transformers or switching circuits. At the point of use, such as the dual-voltage charging station described herein, the grid power could arrive at various amplitudes and frequencies, e.g., nominal 110-120V or 220-240V AC power at 50-60 Hz, or at higher voltage levels such as 277-480V or more. Therefore, the disclosed charging station may be optionally configured to selectively boost, reduce, or relay the AC supply voltage at an application-suitable AC voltage level. The AC supply voltage, whether it is boosted, reduced, or unchanged in amplitude, is rectified into the DC charging voltage using a voltage rectifier housed within the charging station.

In some station configurations, a combination charge coupler may have separate AC and DC pins, while in other configurations the AC pins and the DC pins may be housed in separate charge couplers. For simplicity, the term "charge coupler" will be used in the singular below without limiting the scope to combination charge couplers. The AC pins carry the above-noted accessory voltage at the relatively low first voltage level V1. The DC pins, which are connected to the voltage rectifier, carry the DC charging voltage at the relatively high second voltage level V2. The AC and DC pins respectively engage mating AC and DC receptacles located on a charging port of the mobile platform. One or more controllers are used to regulate the simultaneous delivery of the DC charging voltage and the AC or DC accessory voltage to the mobile platform in response to control signals.

The above summary is not intended to represent every embodiment or aspect of the present disclosure. Rather, the foregoing summary exemplifies certain novel aspects and features as set forth herein. The above noted and other features and advantages of the present disclosure will be readily apparent from the following detailed description of representative embodiments and modes for carrying out the present disclosure when taken in connection with the accompanying drawings and the appended claims.

BRIEF DESCRIPTION OF THE DRAWINGS

FIGS. 3-5 are schematic circuit diagrams depicting possible implementations of the present disclosure.

FIG. 6 is a table describing possible operating modes using the topology of FIG. 4.

Figure 1:
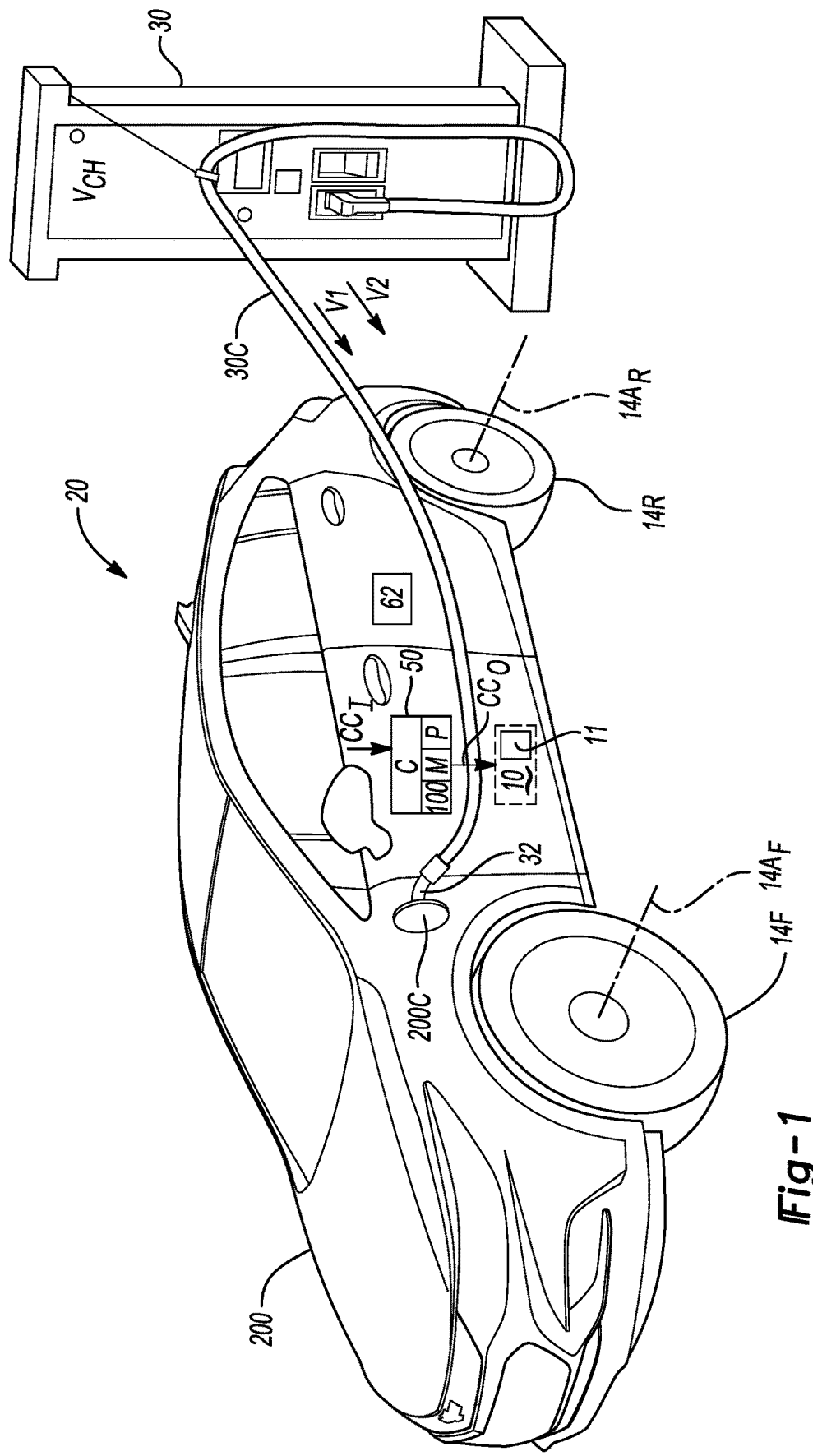
FIG. 1 is a schematic illustration of an example mobile platform undergoing a direct current fast charging ("DCFC") process at a high voltage level while simultaneously receiving an alternating current ("AC") or a direct current ("DC") accessory voltage at a lower voltage level as set forth herein.

The present disclosure is susceptible to modifications and alternative forms, with representative embodiments shown by way of example in the drawings and described in detail below. Inventive aspects of this disclosure are not limited to the particular forms disclosed. Rather, the present disclosure is intended to cover modifications, equivalents, combinations, and alternatives falling within the scope of the disclosure as defined by the appended claims.

DETAILED DESCRIPTION

Referring to the drawings, wherein like reference numbers refer to the same or like components in the several Figures, a single or multi-module battery pack 11 is shown schematically in FIG. 1 as part of an electric powertrain 10. In the depicted representative embodiment, the electric powertrain 10 powers propulsion functions of an exemplary mobile platform 20 having a body 200, with "exemplary" as used herein meaning a non-limiting example configuration illustrating certain aspects of the present teachings, i.e., not necessarily advantageous or preferred over other possible implementations. While the mobile platform 20 is depicted as an electric vehicle, other rechargeable platforms or systems may be used within the scope of the disclosure, including transportation platforms, robots, or other types of vehicles, and therefore the electric vehicle embodiment of FIG. 1 is non-limiting and illustrative of the present teachings.

The mobile platform 20 is shown undergoing a direct current fast-charging ("DCFC") process using an offboard dual-voltage charging station system 30, which may be one charging station or multiple charging stations as described below. That is, the charging station system 30 is configured to simultaneously provide an alternating current ("AC") or direct current ("DC") accessory voltage at a first voltage level ("V1") and a DC charging voltage at a second voltage level ("V2"), with V2 exceeding V1, e.g., V2 may be at least twice the magnitude of V1. When charging the battery pack 11, the mobile platform 20 is electrically connected to the charging station system 30 using a charging port 200C. An electrical connection between the charging station system 30 and the charging port 200C may be achieved using a length of high-voltage charging cable 30C. A charge coupler 32 located at a terminal end of the charging cable 30C may be configured as an SAE J1772, SAE Combo Charging System ("CCS"), CHAdeMO, or other country-specific or application-suitable charge plug, with the charge coupler 32 possibly having the example construction shown in FIG. 2.

The mobile platform 20 in the illustrated example embodiment includes front and rear road wheels 14F and 14R, respectively. The road wheels 14F and 14R are connected to separate front and rear drive axles $14A_F$ and $14A_R$, respectively. The drive axles $14A_F$ and $14A_R$ may be individually powered by separate rotary electric machines (not shown) in some embodiments, each of which functions as traction motors and energized via corresponding power inverter module (not shown).

The mobile platform 20 of FIG. 1 may be variously embodied as a plug-in electric vehicle having the battery pack 11, e.g., a multi-cell lithium ion, zinc-air, nickel-metal hydride, or lead acid battery pack 11, that can be selectively recharged via a charging voltage ("$V_{CH}$") from the charging station system 30 at the level of V2. When the mobile platform 20 is in operation, switching control of the battery pack 11 is performed by an onboard controller 50, via control signals (arrow CCo), to ultimately energize the electric machine(s) (not shown) as noted above, to generate and deliver motor torque to the road wheels 14F and/or 14R, and to thereby propel the mobile platform 20 and/or to perform other useful work. Thus, the battery pack 11 and the controller 50 together form a battery system, with other possible components omitted for illustrative simplicity, e.g., thermal management/cooling and power electronic hardware.

The controller 50 shown schematically in FIG. 1 includes a processor (P) and memory (M), with the memory (M) including application-suitable amounts of tangible, non-transitory memory, e.g., read only memory, whether optical, magnetic, flash, or otherwise. The controller 50 also includes application-sufficient amounts of random-access memory, electrically-erasable programmable read only memory, and the like, as well as a high-speed clock, analog-to-digital and digital-to-analog circuitry, and input/output circuitry and devices, as well as appropriate signal conditioning and buffer circuitry. The controller 50 is programmed to execute instructions 100 for charging the battery pack 11 at the second voltage level V2 while simultaneously powering an accessory load 62 with the first voltage level V1. To do this, the controller 50 receives input signals (arrow $CC_I$) indicative of a charging request and a present demand state of the accessory load 62, with the controller 50 outputting the control signals (arrow $CC_O$) in response to the input signals (arrow $CC_I$).

Figure 2:
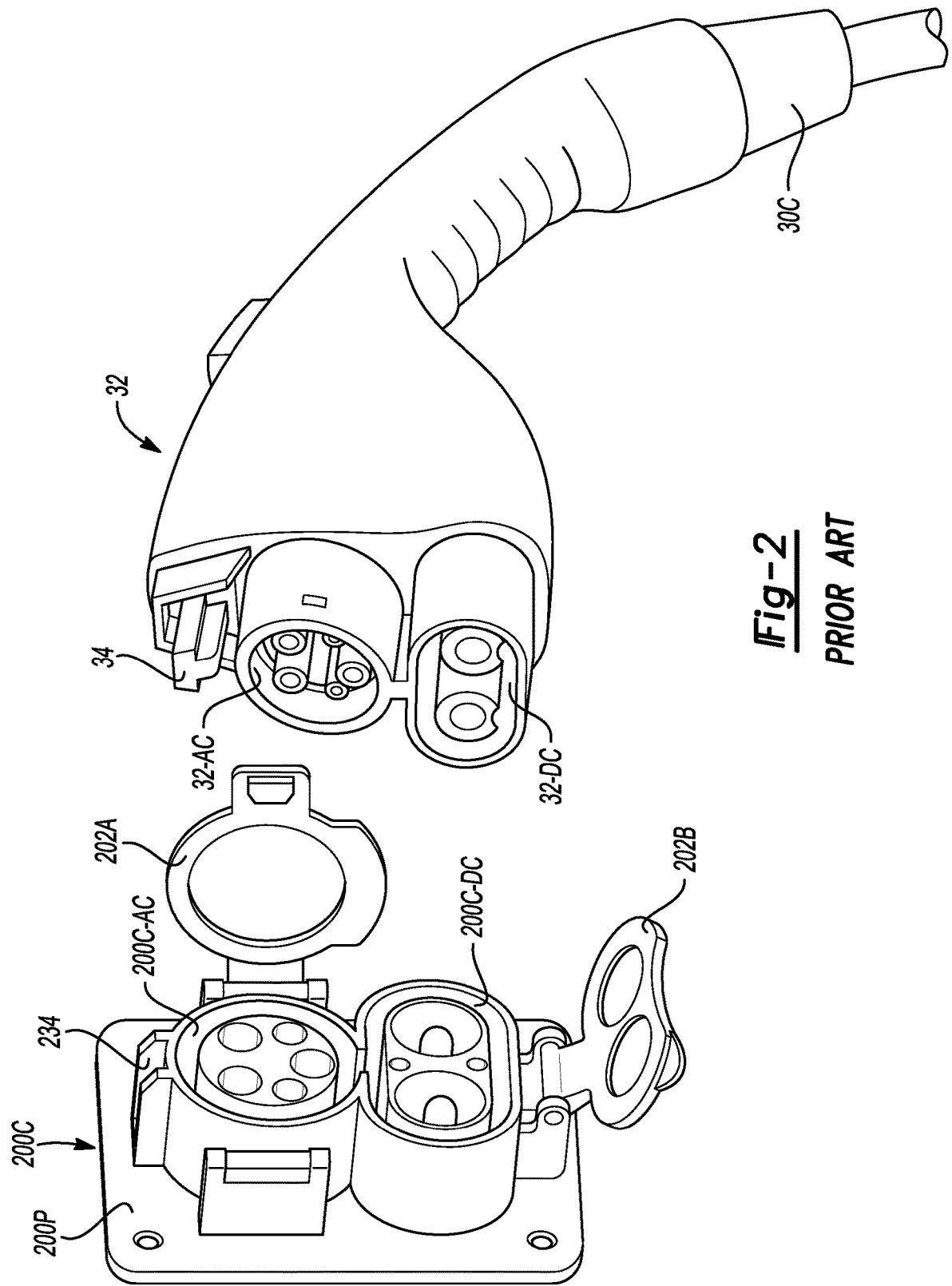
FIG. 2 is a schematic perspective view illustration of a prior art charging port usable with the mobile platform of FIG. 1.

The various illustrative circuit topologies described below with reference to FIGS. 3-7 simultaneously provide accessory power (AC or DC) and DC charging power from the charging station system 30 to the mobile platform 20 at the respective first and second voltage levels V1 and V2. Referring to FIG. 2, for example, some embodiments of the charge coupler 32 located at a terminal end of the charging cable 30C may be a combination charger as shown. Such a charge coupler 32 typically includes AC pins 32-AC and DC pins 32-DC, as well as a latching mechanism 34. Similarly, the charging port 200C may include a plate 200P mounted to the body 200 (FIG. 1) and supporting mating AC and DC receptacles 200C-AC and 200C-DC, respectively, and an anchor 234 to which the latching mechanism 34 of the charge coupler 32 is releasably secured during charging.

As will be appreciated by those of ordinary skill in the art, at the onset of a charging operation an operator of the mobile platform 20 of FIG. 1, or a charging robot (not shown), manually plugs the charge coupler 32 into the charging port 200C until the latching mechanism 34 securely locks onto the anchor 234, thereby preventing inadvertent separation of the charge coupler 32 during charging. To prevent ingress of dirt and moisture when the charging port 200C is not in use, the respective AC and DC receptacles 200C-AC and 200C-DC may be covered by access doors 202A and 202B. Such access doors 202A and 202B may be hinged to the plate 200P. The controller 50 and the charging station system 30 of FIG. 1 thereafter perform a "handshake" operation in which two-way communication is established via a communications protocol and the necessary information for charging is exchanged, as described above. The charging process then commences, with the present approach including simultaneous delivery of AC and DC power to the mobile platform 20 via the charge connector 32 or another embodiment thereof, depending on the country-specific charging hardware.

FIGS. 3-7 depict possible embodiments for performing a fast-charging process during which, upon successful connection of the charge coupler 32 to the charging port 200C, the dual-voltage charging station system 30 of FIGS. 1 and 2 simultaneously supplies a DC charging voltage at the second voltage level V2 and an AC or DC accessory voltage at the first voltage level V1. The particular implementation of the present teachings depends largely on the configuration and maximum charging voltage of the charging station system 30 that is encountered by the mobile platform 20 during a given fast-charging operation. Therefore, the various depicted embodiments are intended to be exemplary of the present teachings without limiting the scope of the disclosure to the illustrated topologies.

In each of the disclosed embodiments, the charging station system 30 is configured to receive an AC supply voltage (arrow "AC") from an AC voltage source 55, e.g., the polyphase grid power as noted above. The charging station system 30 includes an AC-to-DC ("AC-DC") conversion stage 35 which, as will be appreciated, includes hardware and possibly software collectively configured to rectify, reduce, boost, and/or filter the AC supply voltage as needed, and thereby provide a DC charging voltage ("V2-DC") at the second voltage level V2, e.g., using diodes, semiconductor switches, suitable signal filtering hardware, and/or transformers, as will be understood by those of ordinary skill in the art. The DC charging voltage is then delivered to the DC pins 32-DC of the charge coupler 32.

The charging station system 30 may optionally include a voltage transformer ("T") 41 that is operable to boost or reduce the AC supply voltage to an application-specific voltage level, i.e., the first voltage level V1. The charging station system 30 relays the AC supply voltage or its boosted/reduced variation as an AC variation of the accessory voltage ("V1-AC"). As used herein, the term "relays" refers to the provision of the AC supply voltage, at a boosted, un-boosted, or reduced level as needed, through the charging station system 30 to the AC pins 32-AC of the charge coupler 32.

Optionally, the AC-DC conversion stage 35 aboard the charging station system 30 may feed a DC-DC converter 39 that is configured to reduce the DC voltage output from the AC-DC conversion stage 35, i.e., from the higher second voltage level V2 to the lower first voltage level V1, as a DC accessory voltage ("V1-DC"). In lieu of feeding an AC voltage to the charge coupler 32, such an embodiment would instead feed the DC accessory voltage V1-DC into positive (+) and negative (−) AC pins 32-AC, as will be appreciated by those of ordinary skill in the art, with the neutral (N) terminal of the AC pins 32-AC being unused in such an embodiment. The embodiment in which the accessory voltage is an AC voltage, i.e., V1-AC, will be described hereinafter without limiting the present teachings.

The AC pins 32-AC of the charge coupler 32 are hardwired to the charging station system 30 via the charging cable 30C to receive the accessory voltage V1-AC at the first voltage level V1. Likewise, the DC pins 32-DC of the charge coupler 32 are hardwired to the charging station system 30 via the charging cable 30C to receive the DC charging voltage (V2-DC) at the higher second voltage level V2. The AC pins 32-AC and DC pins 32-DC engage the respective AC and DC receptacles 200C-AC and 200C-DC of the charging port 200C (see FIGS. 1 and 2), with the charging port 200C omitted from FIG. 4 for illustrative clarity.

The controller 50 of the mobile platform is configured to request, and the charging station system 30 is configured to simultaneously deliver, the respective accessory voltage and DC charging voltage, with such a process occurring in response to a charging control signal (arrow $CC_{CH}$) from the controller 50 (see FIG. 1), possibly in communication and close coordination with a station controller $C_{30}$ located aboard or connected to the charging station system 30, as will be appreciated by those of ordinary skill in the art.

The exemplary embodiment of FIG. 3 depicts a simplified circuit topology in which the offboard dual-voltage charging station system 30 of the present disclosure performs a DCFC operation to charge the battery pack ("BAT") 11 at the higher second voltage level V2, e.g., 800V, over a high-voltage DC voltage bus 61H. The battery pack 11 is connected to positive (+) and negative (−) rails of a lower-voltage DC voltage bus 61L, and is selectively connectable to/disconnectable from an onboard charger ("OBC") 60 of the mobile platform 20 shown in FIG. 1, e.g., using switches S52. As will be appreciated, an onboard charger such as the OBC 60 is an AC-to-DC rectifier in combination with a DC-DC voltage converter, such that the OBC 60 is configured to output the DC accessory voltage at the first voltage level V1.

In the above-noted embodiment in which the accessory voltage is already a DC voltage, i.e., V1-DC, the accessory voltage may be fed directly to the accessory load 62, thereby bypassing the OBC 60. If an additional AC voltage is provided by charging station system 30 during the DCFC process, such a voltage could be provided to the accessory load ("ACC") 62 via the OCB 60. That is, the infrastructure of the charging station system 30 may be configured such that high-voltage DC and AC voltages are provided at the same time. The accessory load 62 may be variously embodied a power inverter module, auxiliary power module, air conditioning or other type of compressor, etc., and may be electrically connected to the voltage bus 61. Such an accessory load 62 may require power during the DC fast-charging process of the battery pack 11, with the circuit topologies of FIGS. 3-5 and 7 providing such a capability.

FIG. 4 depicts a conceptual schematic depiction of how two similar-configured charging stations 30A and 30B may each be configured to output a charging voltage at the first voltage level V1, e.g., 400V. The charging stations 30A and 30B may be adjacent charging stations, for instance, so that the charging stations 30A and 30B may be selectively interconnected via the charge coupler 32 and switches S55 to provide the DC charging voltage at the second voltage level V2, e.g., 800V using the above-noted exemplary 400V embodiment.

For instance, at the onset of charging, and via operation of the switches S55, the positive terminal (+) of the charging station system 30A may be selectively connected to the negative terminal (−) of the charging station system 30B, and vice versa, such that two lower-voltage charging stations at V1 together provide the higher second charging voltage level V2 to the DC pins 32-DC. At the same time, one of the charging stations 30A or 30B alone may provide the first voltage level V1 to the AC pins 32-AC to thereby power the accessory load 62.

Figure 5:
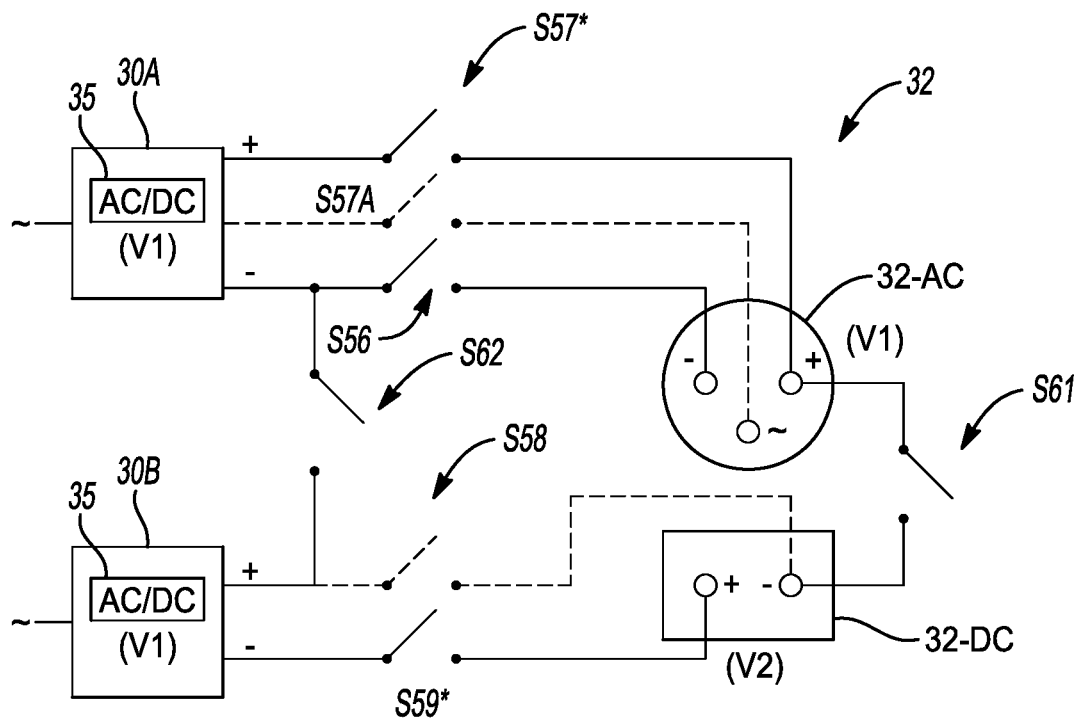

FIG. 5 depicts a possible implementation of the concept shown in FIG. 4 using two V1-level charging stations 30A and 30B connected to the AC pins 32-AC and DC pins 32-DC via switches S56, S57*, S58, S59*, S61, and S62, and possibly S57A when an AC voltage is provided by charging station 30A, with * indicating optional switches. Opening or closing of the switches in different combinations, as indicated in table 70 of FIG. 5, connects the charging stations 30A and 30B together in series to deliver the higher second voltage level V2 to the DC pins 32-DC, and to simultaneously deliver the lower voltage level V1 as an AC or a DC voltage to the AC pins 32-AC to power the accessory load 62 (see FIG. 3). The accessory load 62 is thereafter powered at the lower first voltage level V1 during the DCFC process while the battery pack 11 is simultaneously charged via the second voltage level V2.

Referring briefly to table 70 of FIG. 5, operating modes ("OM") are available in which a first operating mode (1) allows the charging station 30B to perform the DCFC process via the second voltage level, i.e., V2-DC while charging station 30A provides the lower-voltage level, V1-DC. A second operating mode (2) performs lower-voltage charging using charging station 30B and voltage V1-DC while charging station 30A powers the accessory load 62 using voltage V1-AC, i.e., an AC voltage. In table 70, "1" represents a CLOSED/conducting state and "0" represents an OPEN/non-conducting state. Switch S57A of FIG. 5 is omitted from table 70 for simplicity, but would have the same ON/OFF state as switches S57* and S56.

Figure 7:
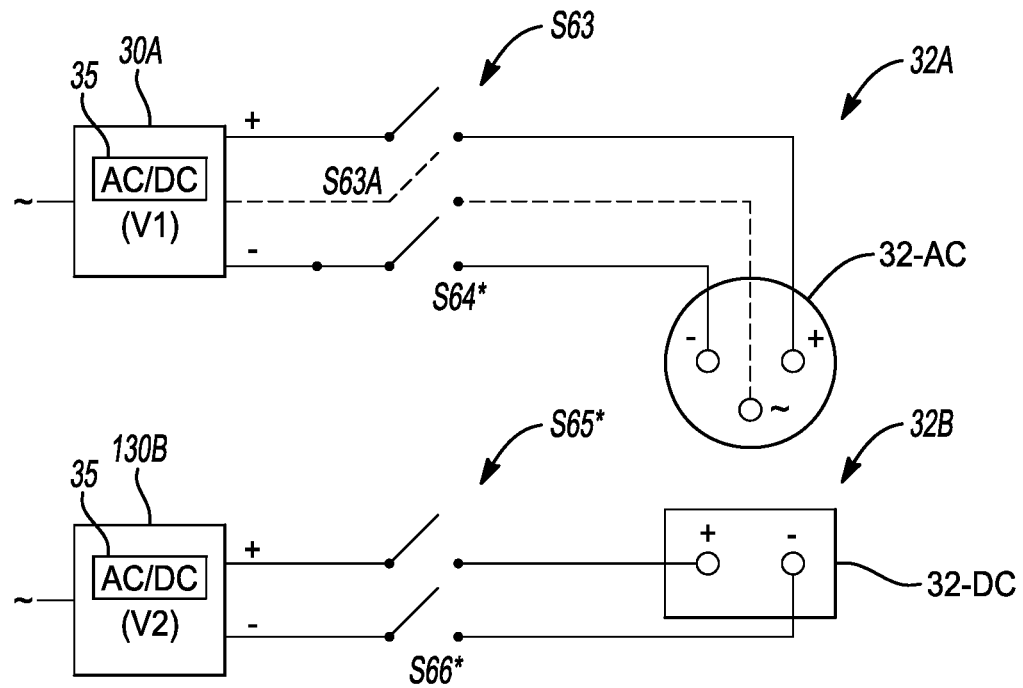
FIG. 7 is a schematic circuit diagram depicting another possible implementation of the present disclosure.

FIG. 7 depicts use of two charging stations 30A and 130B having different maximum charging voltages levels, i.e., the first and second voltage levels V1 and V2, respectively. In this embodiment, the first voltage level V1 is provided by charging station system 30A directly to the AC pins 32-AC. Similarly, the DC pins 32-DC are energized by charging station 130B at the higher second voltage level V2, with voltage levels V1 and V2 possibly being 400V and 800V, respectively, in the above-noted non-limiting illustrative embodiment. The AC pins 32-AC in some embodiments may be part of a different charge coupler 32A than the charge coupler 32B containing the DC pins 32-DC, e.g., with separate cables connecting charge couplers 32A and 32B to charging stations 30A and 30B, respectively. Switches S63* and S64* may be used to connect or disconnect the charge coupler 32 to or from the charging stations 30A and 130B, with switch S63A being used when the charging station 30A outputs an AC voltage.

The present teachings enable a method for charging the battery pack 11 of the mobile platform 20 using the dual-voltage charging station system 30. Such a method may include detecting, via the controller 50, an engagement of the AC pins 200C-AC and DC pins 200C-DC of the charge coupler 32 with the respective AC and DC receptacles 32-AC and 32-DC of the charging port 200C, e.g., as shown in FIG. 2. In response to detecting the engagement, the method may include rectifying the AC supply voltage (arrow AC of FIG. 3) from the AC power supply 55 using the AC-to-DC conversion stage 35 in order to provide the DC charging voltage V2-DC to the battery pack 11. Simultaneously, the AC or DC accessory voltage V1-AC or V1-DC is supplied to the accessory load 62 of the mobile platform 20, as shown in FIG. 3, at the first voltage level V1 and the DC charging voltage V2-DC is supplied to the battery pack 11 at the second voltage level V2, via the AC pins 32-AC and the DC pins 32-DC, respectively.

The exemplary embodiments of FIGS. 3-6 provide just a few possible implementations of the present teachings. Each embodiment provides a way to avoid the need for inclusion of a step-down DC-DC converter aboard the mobile platform 20 to power the accessory load 62 during charging of the battery pack 11, as well as the need for voltage isolation between higher-voltage and lower-voltage sides of such a converter. As will be appreciated, such DC-DC converters are generally large and, due to the use of transformer windings, relatively heavy. Thus, the elimination of the DC-DC converter from the mobile platform 20 is one possible advantage of the disclosed topologies.

Additionally, the present approach minimizes the possibility that undesirable charge imbalances will result within the battery pack 11. In embodiments in which the battery pack 11 is constructed from multiple smaller battery packs selectively connected in series during the charging process, for instance, one such battery pack may be relied upon to power the accessory load 62 to the exclusion of the other battery pack(s), thereby leading to such a charge imbalance. These and other benefits of the present teachings will be readily appreciated by those of ordinary skill in the art in view of the foregoing disclosure.

While some of the best modes and other embodiments have been described in detail, various alternative designs and embodiments exist for practicing the present teachings defined in the appended claims. Those skilled in the art will recognize that modifications may be made to the disclosed embodiments without departing from the scope of the present disclosure. Moreover, the present concepts expressly include combinations and sub-combinations of the described elements and features. The detailed description and the drawings are supportive and descriptive of the present teachings, with the scope of the present teachings defined solely by the claims.

What is claimed is:

1. A dual-voltage charging station system for use with an alternating current ("AC") power supply and a mobile platform having a charging port, the charging station system comprising:
    a charge coupler collectively providing AC pins and direct current ("DC") pins configured to engage with respective AC and DC receptacles of the charging port;
    an AC-to-DC conversion stage connected to the charge coupler and the AC power supply, wherein the AC-to-DC conversion stage is configured to rectify, reduce, boost, and/or filter the AC supply voltage to thereby produce a DC charging voltage;
    at least one cable connecting the AC-to-DC conversion stage to the charge coupler such that the AC pins receive an AC or DC accessory voltage from the charging station at a first voltage level, and such that the DC pins receive the DC charging voltage at a second voltage level that equals or exceeds the first voltage level;
    a voltage transformer configured to boost or reduce the AC supply voltage and thereby selectively output the accessory voltage as an AC voltage; and
    a controller configured, in response to input signals, to command simultaneous delivery of the accessory voltage and the DC charging voltage to the mobile platform via the AC pins and the DC pins, respectively.

2. The dual-voltage charging station system of claim 1, further comprising a DC-to-DC voltage converter connected to the AC-to-DC conversion stage, and configured to selectively output the accessory voltage as a DC voltage.

3. The dual-voltage charging station system of claim 1, wherein the charging station system includes first and second charging stations that are selectively interconnected via a set of switches, and wherein the charge coupler is shared by the first and second charging stations.

4. The dual-voltage charging station system of claim 3, wherein the first charging station provides the AC voltage to the AC pins at the first voltage level and the second charging station provides the DC charging voltage to the DC pins at the second voltage level.

5. The dual-voltage charging station system of claim 3, wherein the first voltage level is 300-500V and the second voltage level is 600-1000V.

6. The dual-voltage charging station system of claim 3, wherein the set of switches includes a first switching pair connecting the first charging station to the AC pins, and a second switching pair connecting the second charging station to the DC pins.

7. The dual-voltage charging station system of claim 3, wherein the set of switches includes a switch connecting one of the AC pins to one of the DC pins.

8. A method for charging a battery pack of a mobile platform using a dual-voltage charging station system, the method comprising:
    detecting, via a controller, an engagement of alternating current ("AC") pins and direct current ("DC") pins of a charge coupler of the dual-voltage charging station system with respective AC and DC receptacles of a charging port of the mobile platform;
    in response to detecting the engagement, rectifying an AC supply voltage from an AC power supply using an AC-to-DC conversion stage to provide a DC charging voltage to the battery pack;
    boosting or reducing the AC supply voltage via a voltage transformer voltage to selectively output an AC accessory voltage, or using a DC-to-DC voltage converter connected to the AC-to-DC conversion stage to output a DC accessory voltage; and
    simultaneously delivering the AC accessory voltage or the DC accessory voltage to an accessory load of the mobile platform at a first voltage level and the DC charging voltage to the battery pack at a second voltage level, via the AC pins and the DC pins, respectively, wherein the first voltage level is less than the second voltage level.

9. The method of claim 8, further comprising boosting or reducing the AC supply voltage via the voltage transformer voltage to selectively output the AC accessory voltage using the voltage transformer of the charging station.

10. The method of claim 8, wherein the dual-voltage charging station system includes first and second charging stations that share the charge coupler, the method further comprising selectively connecting the first and second charging stations to each other via a set of switches using the controller.

11. The method of claim 10, wherein simultaneously delivering the accessory voltage and the DC charging voltage includes applying the accessory voltage to the AC charging pins via the first charging station and applying the DC charging voltage to the DC charging pins via the second charging station.

12. The method of claim 11, wherein the second voltage level is twice the first voltage level.

13. The method of claim 12, wherein the set of switches includes a first switching pair connecting the first charging station to the AC pins, and a second switching pair connecting the second charging station to the DC pins.

14. The method of claim 12, wherein the set of switches includes a switch connecting one of the AC pins to one of the DC pins.

15. The method of claim 8, wherein the mobile platform is a motor vehicle.

16. The method of claim 15, wherein the accessory load includes a compressor, a power inverter module, and/or an auxiliary power module.

17. The method of claim 8, further comprising using the DC-to-DC voltage converter connected to the AC-to-DC conversion stage to output the DC accessory voltage.

18. A dual-voltage charging station system for use with an alternating current ("AC") power supply and a mobile platform having a charging port, the charging station system comprising:
    a charge coupler collectively providing AC pins and direct current ("DC") pins configured to engage with respective AC and DC receptacles of the charging port;
    an AC-to-DC conversion stage connected to the charge coupler and the AC power supply, wherein the AC-to-DC conversion stage is configured to rectify, reduce, boost, and/or filter the AC supply voltage to thereby produce a DC charging voltage;
    at least one cable connecting the AC-to-DC conversion stage to the charge coupler such that the AC pins receive an AC or DC accessory voltage from the charging station at a first voltage level, and such that the DC pins receive the DC charging voltage at a second voltage level that equals or exceeds the first voltage level;
    a DC-to-DC voltage converter connected to the AC-to-DC conversion stage, and configured to output the accessory voltage as a DC voltage; and
    a controller configured, in response to input signals, to command simultaneous delivery of the accessory voltage and the DC charging voltage to the mobile platform via the AC pins and the DC pins, respectively.

19. The dual-voltage charging station system of claim 18, wherein the charging station system includes first and second charging stations that are selectively interconnected via a set of switches, and wherein the charge coupler is shared by the first and second charging stations.

20. The dual-voltage charging station system of claim 18, wherein the first charging station provides the AC voltage to the AC pins at the first voltage level and the second charging station provides the DC charging voltage to the DC pins at the second voltage level, and wherein the first voltage level is 300-500V and the second voltage level is 600-1000V.

* * * * *